United States Patent
Vu et al.

(10) Patent No.: US 10,465,559 B2
(45) Date of Patent: Nov. 5, 2019

(54) GAS TURBINE ENGINE VANE ATTACHMENT FEATURE

(71) Applicant: United Technologies Corporation, Farmington, CT (US)

(72) Inventors: Ky H. Vu, East Hartford, CT (US); Bryan P. Dube, Columbia, CT (US); Michael J. Allen, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 91 days.

(21) Appl. No.: 15/839,932

(22) Filed: Dec. 13, 2017

(65) Prior Publication Data

US 2019/0178107 A1 Jun. 13, 2019

(51) Int. Cl.
*F01D 25/24* (2006.01)
*F01D 9/04* (2006.01)
*F04D 29/54* (2006.01)

(52) U.S. Cl.
CPC ........... *F01D 25/246* (2013.01); *F01D 9/042* (2013.01); *F04D 29/542* (2013.01); *F05B 2250/11* (2013.01); *F05B 2250/292* (2013.01); *F05D 2240/12* (2013.01); *F05D 2240/14* (2013.01); *F05D 2250/11* (2013.01); *F05D 2250/292* (2013.01); *F05D 2260/941* (2013.01)

(58) Field of Classification Search
CPC ........ F01D 9/041; F01D 9/042; F01D 25/246; F04D 29/542; F04D 29/544; F05D 2250/11; F05D 2240/80; F05D 2240/81; F05D 2250/292; F05D 2260/941; F05D 2240/801; F05B 2250/11; F05B 2240/80; F05B 2250/292
USPC ............................ 415/189–190, 209.2–209.4
See application file for complete search history.

(56) References Cited

U.S. PATENT DOCUMENTS

| | | | |
|---|---|---|---|
| 3,365,173 A | 1/1968 | Lynch et al. | |
| 6,773,229 B1 * | 8/2004 | Itzel | F01D 9/041 415/191 |
| 7,922,444 B2 | 4/2011 | Propheter-Hinckley | |
| 8,684,683 B2 | 4/2014 | Brunt et al. | |
| 9,745,864 B2 | 8/2017 | Willett et al. | |
| 2003/0068225 A1 | 4/2003 | Housley et al. | |
| 2010/0284811 A1 * | 11/2010 | Druez | F01D 9/042 416/179 |
| 2013/0302151 A1 | 11/2013 | Ring | |

(Continued)

OTHER PUBLICATIONS

The Extended European Search Report for EP Application No. 18212467.7, dated Mar. 28, 2019.

*Primary Examiner* — Christopher Verdier
(74) *Attorney, Agent, or Firm* — Carlson, Gaskey & Olds, P.C.

(57) ABSTRACT

A component for a gas turbine engine includes at least one airfoil that has a radially inner end and a radially outer end. A platform has a gas path side that supports the radially outer end of the at least one airfoil and a non-gas path side. A hook is supported by the platform and has an anti-rotation surface that faces in a circumferential direction. A conical surface is spaced axially forward of a base portion of the hook. A triangular base surface intersects the anti-rotation surface and is spaced radially outward from the conical surface.

20 Claims, 3 Drawing Sheets

(56) References Cited

U.S. PATENT DOCUMENTS

2015/0226075 A1* 8/2015 Aoki .................... F01D 25/246
 415/209.3
2016/0003070 A1 1/2016 Kastel

* cited by examiner

US 10,465,559 B2

GAS TURBINE ENGINE VANE ATTACHMENT FEATURE

STATEMENT REGARDING FEDERALLY SPONSORED RESEARCH OR DEVELOPMENT

This invention was made with government support under Contract No. FA8626-16-C-2139, awarded by the Air Force. The Government has certain rights in this invention.

BACKGROUND

This disclosure relates generally to a gas turbine engine, and more particularly to a component that can be incorporated into a gas turbine engine. The component can include a vane.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Both the compressor and turbine sections of a gas turbine engine may include alternating rows of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes prepare the airflow for the next set of blades. In turning the airflow for the next set of blades, the turbine vanes must resist the forces of the airflow on the turbine vanes.

SUMMARY

In one exemplary embodiment, a component for a gas turbine engine includes at least one airfoil that has a radially inner end and a radially outer end. A platform has a gas path side that supports the radially outer end of the at least one airfoil and a non-gas path side. A hook is supported by the platform and has an anti-rotation surface that faces in a circumferential direction. A conical surface is spaced axially forward of a base portion of the hook. A triangular base surface intersects the anti-rotation surface and is spaced radially outward from the conical surface.

In a further embodiment of any of the above, the anti-rotation surface includes an anti-rotation fillet that intersects the triangular base.

In a further embodiment of any of the above, the triangular base includes a first edge that extends in an axial direction and intersects the anti-rotation fillet.

In a further embodiment of any of the above, the triangular base includes a second edge that is perpendicular to the first edge. The second edge extends in a circumferential direction.

In a further embodiment of any of the above, a length of the first edge is greater than a length of the second edge.

In a further embodiment of any of the above, the second edge is connected to the conical surface with a transition fillet.

In a further embodiment of any of the above, the transition fillet extends from an inner end of the second edge of the triangular base to a circumferential edge of the platform.

In a further embodiment of any of the above, the triangular base defines a right triangle.

In a further embodiment of any of the above, the platform includes a recessed cavity spaced inward from a perimeter of the platform.

In a further embodiment of any of the above, the triangular base includes a first edge that extends in an axial direction and intersects the anti-rotation fillet. A second edge is perpendicular to the first edge. The second edge extends in a circumferential direction. A hypotenuse edge extends between ends of the first edge and the second edge. The hypotenuse edge partially defines the recessed cavity.

In a further embodiment of any of the above, the triangular base and the anti-rotation surface are circumferentially offset from each other in a non-overlapping relationship and include machined surfaces.

In another exemplary embodiment, a gas turbine engine includes a compressor section. A combustor section is in fluid communication with the compressor section. A turbine section is in fluid communication with the combustor section. One of the compressor section or the turbine section includes at least one component that includes at least one airfoil that has a radially inner end and a radially outer end. A platform that has a gas path side supports the radially outer end of the at least one airfoil and a non-gas path side. A hook supported by the platform has an anti-rotation surface that faces in a circumferential direction. A conical surface is spaced axially forward of a base portion of the hook. A triangular base surface intersects the anti-rotation surface and is spaced radially outward from the conical surface.

In a further embodiment of any of the above, the anti-rotation surface includes an anti-rotation fillet that intersects the triangular base.

In a further embodiment of any of the above, the triangular base includes a first edge that extends in an axial direction and intersects the anti-rotation fillet. A second edge is perpendicular to the first edge. The second edge extends in a circumferential direction.

In a further embodiment of any of the above, a length of the first edge is greater than a length of the second edge.

In a further embodiment of any of the above, the second edge is connected to the planar surface with a transition fillet. The transition fillet extends from an inner end of the second edge of the triangular base to a circumferential edge of the platform.

In a further embodiment of any of the above, a recessed cavity is spaced inward from a perimeter of the platform. The triangular base includes a first edge that extends in an axial direction and intersects the anti-rotation fillet. A second edge is perpendicular to the first edge. The second edge extends in a circumferential direction. A hypotenuse edge extends between ends of the first edge and the second edge. The hypotenuse edge partially defines the recessed cavity.

In a further embodiment of any of the above, the triangular base and the anti-rotation surface are circumferentially offset from each other in a non-overlapping relationship.

In a further embodiment of any of the above, the triangular base includes a triangular base surface that is spaced radially outward from the conical surface and radially inward from the anti-rotation surface.

In a further embodiment of any of the above, the hook engages at least a portion of a static structure of the gas turbine engine.

DETAILED DESCRIPTION

Figure 1:
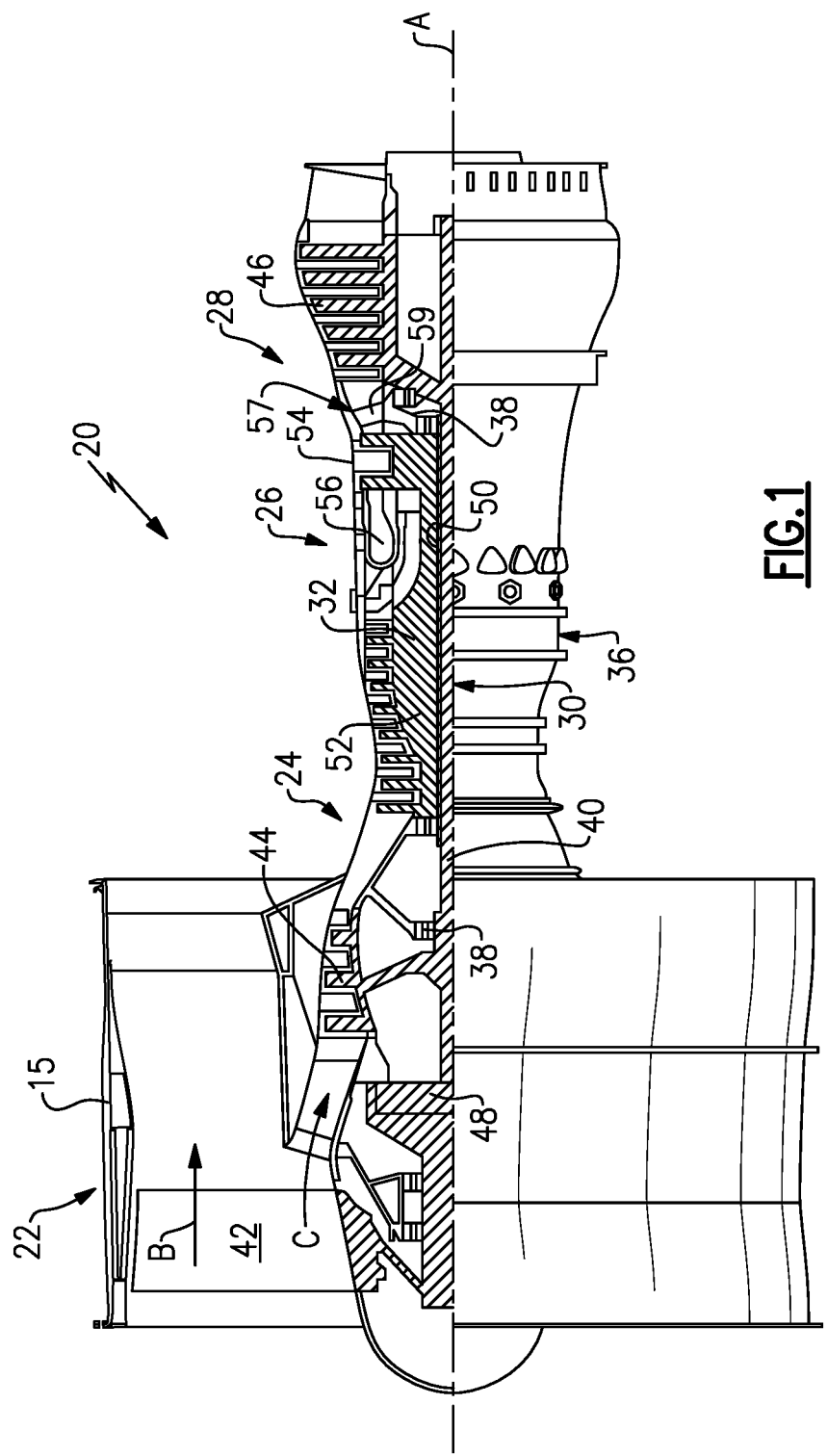
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
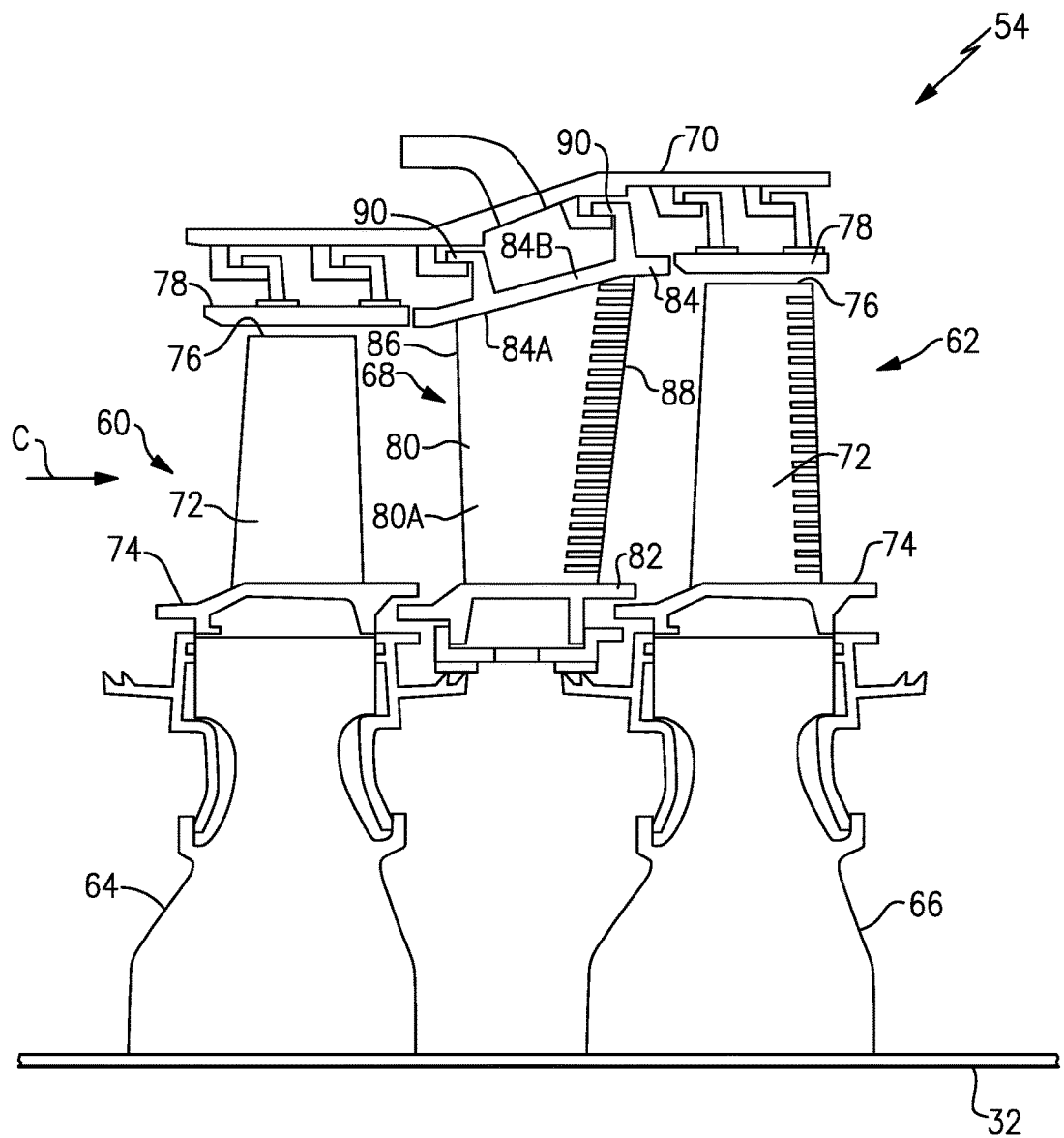
FIG. 2 is a schematic view of a section of the gas turbine engine of FIG. 1, such as a turbine section.

FIG. 2 illustrates a cross-sectional view through a high pressure turbine section 54. In the example high pressure turbine section 54, first and second arrays of rotating blades 60, 62 are axially spaced apart from one another around first and second rotor disks 64, 66, respectively. An array of vanes 68 are located axially between the first and second arrays of blades 60, 62. The first and second arrays of blades 60, 62 and the array of vanes 68 are spaced radially inward from a case structure 70. It should be understood that any number of stages may be used in the example high pressure turbine section 54. Moreover, the disclosed airfoils may be used in the compressor section 26 or the turbine pressure turbine 46.

Each blade in the first and second array of blades 60, 62 includes an airfoil 72 that extends from a platform 74 towards a free end at a blade tip 76. The blade tip 76 is located adjacent a blade outer air seal 78 that is supported by the case structure 70. The blade outer air seals 78 provide an outer boundary of the core flow path C and the platform 74 provides an inner boundary of the core flow path C. The first and second arrays of the blades 60, 62 are operatively connected to the high speed spool 32, for example.

The array of vanes 68 include individual vanes having airfoils 80 that extend between a radially inner platform 82 and a radially outer platform 84 that define the core flow path C. The airfoil 80 includes a pressure side 80A (predominantly concave—FIG. 2) and a suction side 80B (predominantly convex—FIG. 3) extending between a leading edge 86 and a trailing edge 88.

The radially outer platform 84 includes a radially inner side 84A at least partially defining the core flow path C and a radially outer side 84B. The radially outer side 84B includes hooks 90 that secure the array of vanes 68 relative to the case structure 70. It should be understood that the array of vanes 68 may be discrete from one another, arranged in integrated clusters of vanes, or a continuous ring of vanes. In this disclosure, axial, axially, circumferential, circumferentially, radial, or radially are in relation to the engine axis A unless stated otherwise.

Figure 3:
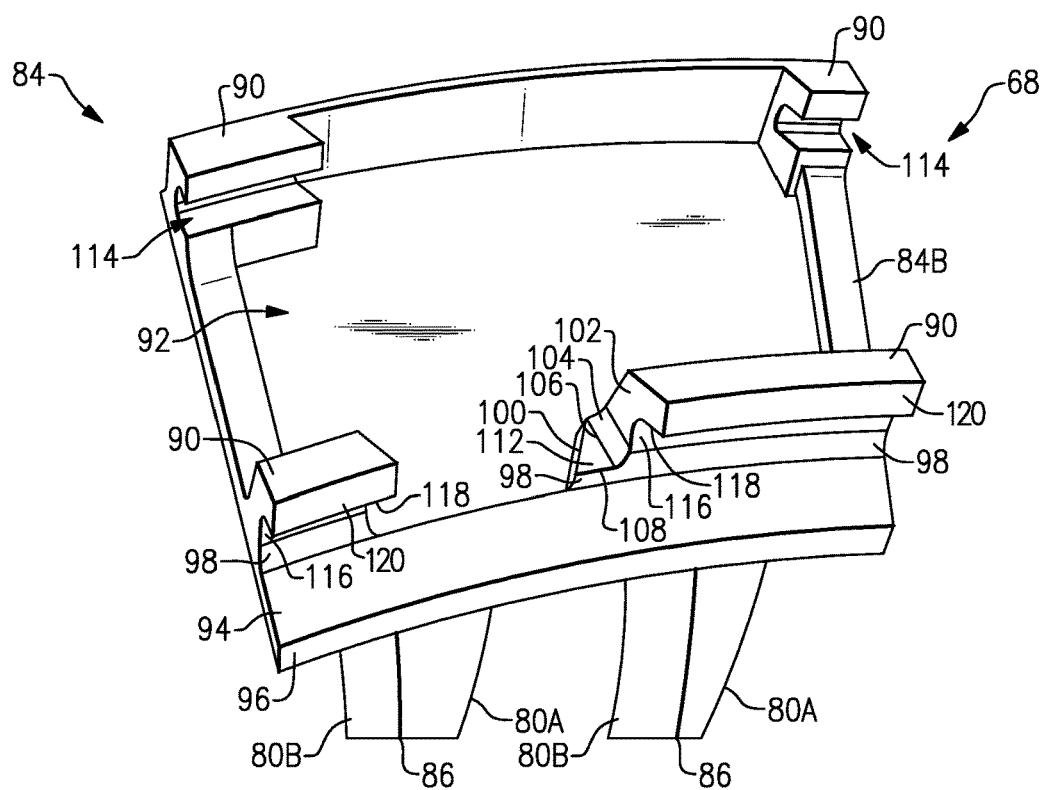
FIG. 3 is a perspective end view of an example vane.

As shown in FIG. 3, the radially outer side 84B of the platform 84 includes a recessed cavity 92 spaced inward from a perimeter of the radially outer platform 84. A leading edge portion of the outer platform 84 includes a conical surface 94. In the illustrated example, the conical surface 94 extends from a leading edge 96 of the outer platform 84 to at least one of the hooks 90 and the recessed cavity 92. Although the conical surface 94 is shown in the illustrated example as having a constant radial dimension, the conical surface 94 could have a varying radial dimension.

Figures 4, 5:
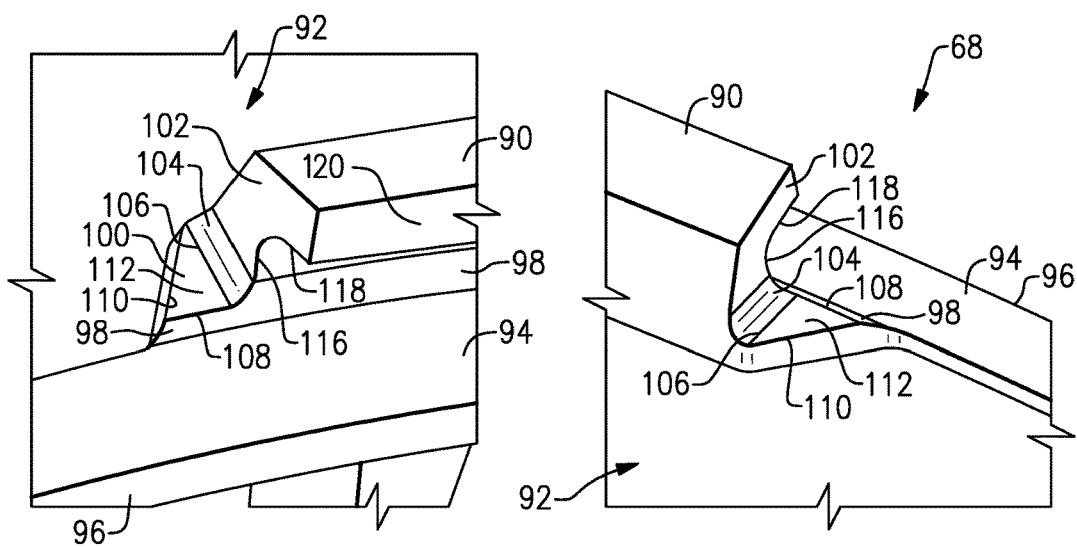
FIG. 4 is an enlarged perspective view of the example vane of FIG. 3.
FIG. 5 is another enlarged perspective view of the example vane of FIG. 3.

As shown in FIG. 4, a downstream edge of the conical surface 94 intersects a transition surface 98, such as a fillet or constant sloped surface, which connects the conical surface 94 to both the hooks 90 and a triangular base 100. The transition surface 98 extends from a circumferential edge of the outer platform 84 inward past the hooks 90 and the triangular base 100.

The hook 90 adjacent the triangular base 100 includes an anti-rotation surface 102 that faces in a circumferential direction towards another one of the hooks 90. The anti-rotation surface 102 engages a portion of the engine static structure 36, such as the case structure 70, to resist the rotational forces exerted on the vane 68 when turning the core airflow C for the next set of blades. A radially inner portion of the anti-rotation surface 102 includes an anti-rotation transition surface 104, such as a fillet or constant sloped surface, which intersects the triangular base 100.

As shown in FIGS. 4-5, the triangular base 100 includes a first edge 106 extending in an axial direction and intersects the anti-rotation surface 102 and a second edge 108 extending in a circumferential direction perpendicular to the first edge 106. A length of the first edge 106 is greater than a length of the second edge 108. In another example, a length of the second edge 108 is greater than a length of the first edge 106. The triangular base 100 also includes a hypotenuse edge 110 extending between non-intersecting ends of the first edge 106 and the second edge 108. The hypotenuse edge 110 of the triangular base 100 partially defines the recessed cavity 92. In the illustrated non-limiting example, the triangular base 100 forms a right triangle. In another example, the triangular base 100 forms a non-right triangle.

A radially outer end of the triangular base 100 includes a triangular surface 112. The triangular surface 112 is spaced radially outward from a radially outermost portion of the conical surface 94 and radially inward from a radially inner most portion of the anti-rotation surface 102. The triangular base 100 and the anti-rotation surface 102 are circumferentially offset from each other in a non-overlapping relationship.

The triangular base 100 allows for a reduction in stress of the hook 90 at the intersection of the anti-rotation surface 102 and the outer platform 84. In particular, the triangular base 100 separates the radial and tangential loads. The resultant stress acting on the hook 90 is reduced through the anti-rotation transition surface 104 in connection with the triangular surface 112 located radially outward from the conical surface 94.

The general shape of the vane 68 is formed by a casting process such that a majority of the vane 68 includes a cast outer surface. Cast outer surfaces can be formed to a fairly high tolerance and smooth surface texture but not as high or as smooth as a machined surface. However, in many applications in the vane 68, the tolerances and surface texture created through casting is acceptable. However, in the present disclosure, several of the features of the outer platform 84 are machined.

In the illustrated non-limiting example, the two aft hooks 90 include slots 114 that are at least partially machined into the two aft hooks 90. Similarly, the two forward hooks 90 are also at least partially formed by a machining process. In particular, an axially forward facing surface 116, a ledge 118, and an axially forward facing surface 120 are formed by a machining process. Additionally, the conical surface 94, the transition surface 98, the anti-rotation surface 102, the anti-rotation transition surface 104, and the triangular surface 112 can be at least partially formed by a machining process.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A component for a gas turbine engine comprising:
   at least one airfoil having a radially inner end and a radially outer end; and
   a platform having a gas path side supporting the radially outer end of the at least one airfoil and a non-gas path side including:
      a hook supported by the platform, wherein the hook includes an anti-rotation surface facing in a circumferential direction;
      a conical surface spaced axially forward of a base portion of the hook; and
      a triangular base surface intersecting the anti-rotation surface and spaced radially outward from the conical surface.

2. The gas turbine engine component of claim 1, wherein the anti-rotation surface includes an anti-rotation fillet that intersects the triangular base.

3. The gas turbine engine component of claim 1, wherein the triangular base includes a first edge that extends in an axial direction and intersects the anti-rotation fillet.

4. The gas turbine engine component of claim 3, wherein the triangular base includes a second edge perpendicular to the first edge and the second edge extends in a circumferential direction.

5. The gas turbine engine component of claim 4, wherein a length of the first edge is greater than a length of the second edge.

6. The gas turbine engine component of claim 4, wherein the second edge is connected to the conical surface with a transition fillet.

7. The gas turbine engine component of claim 6, wherein the transition fillet extends from an inner end of the second edge of the triangular base to a circumferential edge of the platform.

8. The gas turbine engine component of claim 1, wherein the triangular base defines a right triangle.

9. The gas turbine engine component of claim 3, wherein the platform includes a recessed cavity spaced inward from a perimeter of the platform.

10. The gas turbine engine component of claim 9, wherein the triangular base includes a first edge that extends in an axial direction and intersects the anti-rotation fillet, a second edge perpendicular to the first edge, the second edge extending in a circumferential direction, a hypotenuse edge extending between ends of the first edge and the second edge, and the hypotenuse edge partially defines the recessed cavity.

11. The gas turbine engine component of claim 1, wherein the triangular base and the anti-rotation surface are circumferentially offset from each other in a non-overlapping relationship and include machined surfaces.

12. A gas turbine engine, comprising:
a compressor section;
a combustor section in fluid communication with said compressor section;
a turbine section in fluid communication with said combustor section; and
wherein one of the compressor section or the turbine section includes at least one component including:
at least one airfoil having a radially inner end and a radially outer end;
a platform having a gas path side supporting the radially outer end of the at least one airfoil and a non-gas path side including:
a hook supported by the platform, wherein the hook includes an anti-rotation surface facing in a circumferential direction;
a conical surface spaced axially forward of a base portion of the hook; and
a triangular base surface intersecting the anti-rotation surface and spaced radially outward from the conical surface.

13. The gas turbine engine of claim 12, wherein the anti-rotation surface includes an anti-rotation fillet that intersects the triangular base.

14. The gas turbine engine of claim 12, wherein the triangular base includes a first edge that extends in an axial direction and intersects the anti-rotation fillet and a second edge perpendicular to the first edge and the second edge extends in a circumferential direction.

15. The gas turbine engine of claim 14, wherein a length of the first edge is greater than a length of the second edge.

16. The gas turbine engine of claim 14, wherein the second edge is connected to the conical surface with a transition fillet and the transition fillet extends from an inner end of the second edge of the triangular base to a circumferential edge of the platform.

17. The gas turbine engine of claim 12, further comprising a recessed cavity spaced inward from a perimeter of the platform, wherein the triangular base includes a first edge that extends in an axial direction and intersects the anti-rotation fillet, a second edge perpendicular to the first edge, the second edge extending in a circumferential direction, a hypotenuse edge extending between ends of the first edge and the second edge, and the hypotenuse edge partially defines the recessed cavity.

18. The gas turbine engine of claim 12, wherein the triangular base and the anti-rotation surface are circumferentially offset from each other in a non-overlapping relationship.

19. The gas turbine engine of claim 12, wherein the triangular base includes a triangular base surface spaced radially outward from the conical surface and radially inward from the anti-rotation surface.

20. The gas turbine engine of claim 12, wherein the hook engages at least a portion of a static structure of the gas turbine engine.

* * * * *